US012539824B2

(12) United States Patent
Salter et al.

(10) Patent No.: US 12,539,824 B2
(45) Date of Patent: Feb. 3, 2026

(54) LOCKING CONTROL SYSTEM FOR ACCESSORY MANAGEMENT

(71) Applicant: Ford Global Technologies, LLC, Dearborn, MI (US)

(72) Inventors: Stuart C. Salter, White Lake, MI (US); Mathew B. Rutman, Westland, MI (US); Eric Scott Levine, Novi, MI (US); William Wurz, San Francisco, CA (US); Michael Lozano, Detroit, MI (US); Jeff Sturges, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 18/109,981

(22) Filed: Feb. 15, 2023

(65) Prior Publication Data

US 2024/0270205 A1 Aug. 15, 2024

(51) Int. Cl.
*B60R 25/01* (2013.01)
*B60R 25/24* (2013.01)
*B60R 25/32* (2013.01)

(52) U.S. Cl.
CPC .............. *B60R 25/01* (2013.01); *B60R 25/24* (2013.01); *B60R 25/32* (2013.01)

(58) Field of Classification Search
CPC .......... B60R 25/01; B60R 25/24; B60R 25/32
See application file for complete search history.

(56) References Cited

U.S. PATENT DOCUMENTS

| 9,154,486 | B1* | 10/2015 | Saylor ..................... E05B 65/52 |
| 9,842,443 | B1 | 12/2017 | Weng et al. |
| 10,583,962 | B2 | 3/2020 | Brunner et al. |
| 10,703,534 | B2 | 7/2020 | Brunner et al. |
| D895,966 | S | 9/2020 | Brunner et al. |
| D895,967 | S | 9/2020 | Brunner et al. |
| D896,517 | S | 9/2020 | Brunner et al. |
| D896,518 | S | 9/2020 | Brunner et al. |
| D897,103 | S | 9/2020 | Brunner et al. |
| D898,320 | S | 10/2020 | Brunner et al. |
| 10,962,218 | B2 | 3/2021 | Plato et al. |

(Continued)

FOREIGN PATENT DOCUMENTS

| CN | 103541604 A | 1/2014 |
| CN | 105844749 A | 8/2016 |
| WO | 2021076064 A1 | 4/2021 |

OTHER PUBLICATIONS

US 10,947,009 B2, 03/2021, Brunner et al. (withdrawn)
Gridrack (https://www.gridrack.com/pages/smart-products) (Year: 2025).*

*Primary Examiner* — Navid Z. Mehdizadeh
*Assistant Examiner* — Matthew Ho
(74) *Attorney, Agent, or Firm* — Vichit Chea; Carlson, Gaskey & Olds, P.C.

(57) ABSTRACT

A locking control system and method include providing a base plate with an attachment interface and attaching at least one accessory to the base plate via the attachment interface. A user profile is provided that comprises one or more classes of authorization. Locking and unlocking of the at least one accessory to the base plate is controlled based on the user profile and/or locking and unlocking of the at least one accessory itself is controlled based on the user profile.

25 Claims, 2 Drawing Sheets

(56) References Cited

U.S. PATENT DOCUMENTS

| | | | |
|---|---|---|---|
| 10,981,696 B2 | 4/2021 | Brunner et al. | |
| D917,977 S | 5/2021 | Brunner et al. | |
| D918,584 S | 5/2021 | Brunner et al. | |
| D919,296 S | 5/2021 | Brunner et al. | |
| 11,008,136 B2 | 5/2021 | Brunner et al. | |
| D920,671 S | 6/2021 | Brunner et al. | |
| 11,027,883 B1 | 6/2021 | Brunner et al. | |
| D923,935 S | 7/2021 | Brunner et al. | |
| 11,192,690 B1 | 12/2021 | Brunner et al. | |
| 11,268,691 B2 | 3/2022 | Plato et al. | |
| 11,365,026 B2 | 6/2022 | Brunner et al. | |
| 11,427,382 B2 | 8/2022 | Brunner et al. | |
| 11,465,805 B2 | 10/2022 | Brunner et al. | |
| 11,565,850 B1 * | 1/2023 | Lovell | B65D 55/02 |
| 2002/0140245 A1 * | 10/2002 | Coleman, II | B60R 5/04 |
| | | | 296/26.09 |
| 2019/0088057 A1 | 3/2019 | Gengler et al. | |
| 2021/0056788 A1 * | 2/2021 | Chen | G07C 9/00896 |

* cited by examiner

LOCKING CONTROL SYSTEM FOR ACCESSORY MANAGEMENT

TECHNICAL FIELD

This disclosure relates generally to a locking control system that manages locking and unlocking of accessories supported on a base plate.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite.

SUMMARY

In some aspects, the techniques described herein relate to a locking control system, including: a base plate that provides an attachment interface on a support surface, the baseplate configured to engage with at least one accessory via the attachment interface to secure the accessory to the support surface; a user profile comprising one or more classes of authorization; and a controller to control locking and unlocking of the at least one accessory to the base plate based on the user profile and/or to control locking and unlocking of the at least one accessory itself based on the user profile.

In some aspects, the techniques described herein relate to a locking control system including a plate locking mechanism moveable between a locked position where the at least one accessory is locked to the base plate and an unlocked position where the at least one accessory can be removed from the base plate, and wherein the at least one accessory includes an accessory locking mechanism that has a locked condition where access to the at least one accessory is permitted and an unlocked condition where access to the at least one accessory is not permitted.

In some aspects, the techniques described herein relate to a locking control system, wherein the controller controls both the plate locking mechanism and the accessory locking mechanism based on the user profile.

In some aspects, the techniques described herein relate to a locking control system, wherein, the classes of authorization comprise job titles, and wherein a user includes an identifier associated with at least one of the job titles that communicates with the controller.

In some aspects, the techniques described herein relate to a locking control system, wherein the job titles include at least a first title and a second title, wherein the first title has authorization for unlocking only one of the plate locking mechanism and the accessory locking mechanism, and the second title has authorization for unlocking both of the plate locking mechanism and the accessory locking mechanism.

In some aspects, the techniques described herein relate to a locking control system, wherein unlocking of the plate locking mechanism and/or the accessory locking mechanism is authorized if an approved job title from the user profile is within a predetermined distance from the at least one accessory.

In some aspects, the techniques described herein relate to a locking control system, wherein selected job titles from the user profile are authorized at a plurality of worksites.

In some aspects, the techniques described herein relate to a locking control system, wherein the controller automatically locks the plate locking mechanism and the accessory locking mechanism when a vehicle associated with the base plate exceeds a predetermined speed.

In some aspects, the techniques described herein relate to a locking control system, wherein the plate locking mechanism and the accessory locking mechanism are automatically locked if connectivity with the controller is lost.

In some aspects, the techniques described herein relate to a method, including: providing a base plate with an attachment interface; attaching at least one accessory to the base plate via the attachment interface; providing a user profile comprising one or more classes of authorization; and controlling locking and unlocking of the at least one accessory to the base plate based on the user profile and/or controlling locking and unlocking of the at least one accessory itself based on the user profile.

In some aspects, the techniques described herein relate to a method including controlling locking and unlocking of the at least one accessory to the base plate based on the user profile and controlling locking and unlocking of the at least one accessory itself based on the user profile.

In some aspects, the techniques described herein relate to a method, wherein, the classes of authorization comprise job titles.

In some aspects, the techniques described herein relate to a method including providing:
  a plate locking mechanism moveable between a locked position where the at least one accessory is locked to the base plate and an unlocked position where the at least one accessory can be removed from the base plate, and an accessory locking mechanism that has a locked condition where access to the at least one accessory is permitted and an unlocked condition where access to the at least one accessory is not permitted.

In some aspects, the techniques described herein relate to a method, wherein the job titles include at least a first title and a second title, wherein the first title has authorization for unlocking only one of the plate locking mechanism and the accessory locking mechanism, and the second title has authorization for unlocking both of the plate locking mechanism and the accessory locking mechanism.

In some aspects, the techniques described herein relate to a method, wherein the controller controls both the plate locking mechanism and the accessory locking mechanism based on the user profile.

In some aspects, the techniques described herein relate to a method, wherein, the job titles identify levels of authority for worksite jobs including construction, electrical, plumbing, painting, and/or general helper, and wherein a user includes an identifier associated with at least one of the job titles that communicates with a system controller.

In some aspects, the techniques described herein relate to a method including authorizing unlocking of the plate locking mechanism and/or the accessory locking mechanism if an approved job title from the user profile is within a predetermined distance from the at least one accessory.

In some aspects, the techniques described herein relate to a method including authorizing selected job titles from the user profile at a plurality of worksites.

In some aspects, the techniques described herein relate to a method including automatically locking the plate locking mechanism and the accessory locking mechanism when a vehicle associated with the base plate exceeds a predetermined speed.

In some aspects, the techniques described herein relate to a method including automatically locking the plate locking mechanism and the accessory locking mechanism if connectivity with a locking system controller is lost.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a locking control system as used with an accessory mounting system where accessories are mounted to a base plate that is positioned within a vehicle cargo area or on a stationary support surface. Various types of accessories can be secured to the support surface or vehicle through an attachment interface provided by the base plate. The accessories can be electrically coupled to the base plate such that the accessories can receive power or recharge. For example, a cooler or refrigerator can be powered by electrically connecting to a power supply interface provided by the base plate, or a tool box accessory that includes power tools can be connected to the power supply interface such that the power tools can be charged. The disclosure is directed to a locking control system that manages locking of the accessories/boxes to the base plate, as well as locking of the accessories/boxes themselves.

Figure 1:
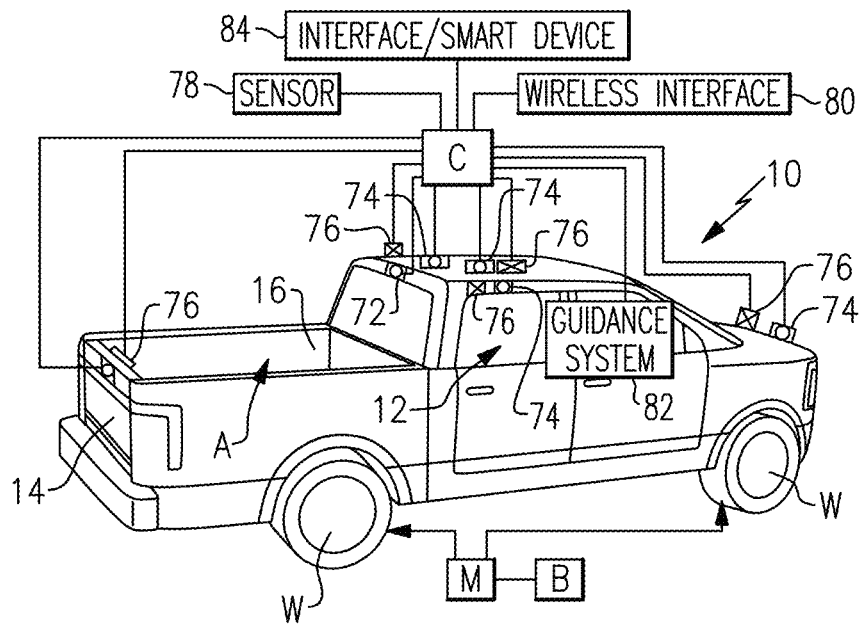
FIG. 1 illustrates a perspective view of a vehicle having a cargo bed that can be equipped with a base plate used to secure and charge accessories according to an exemplary aspect of the present disclosure.
Figure 2:
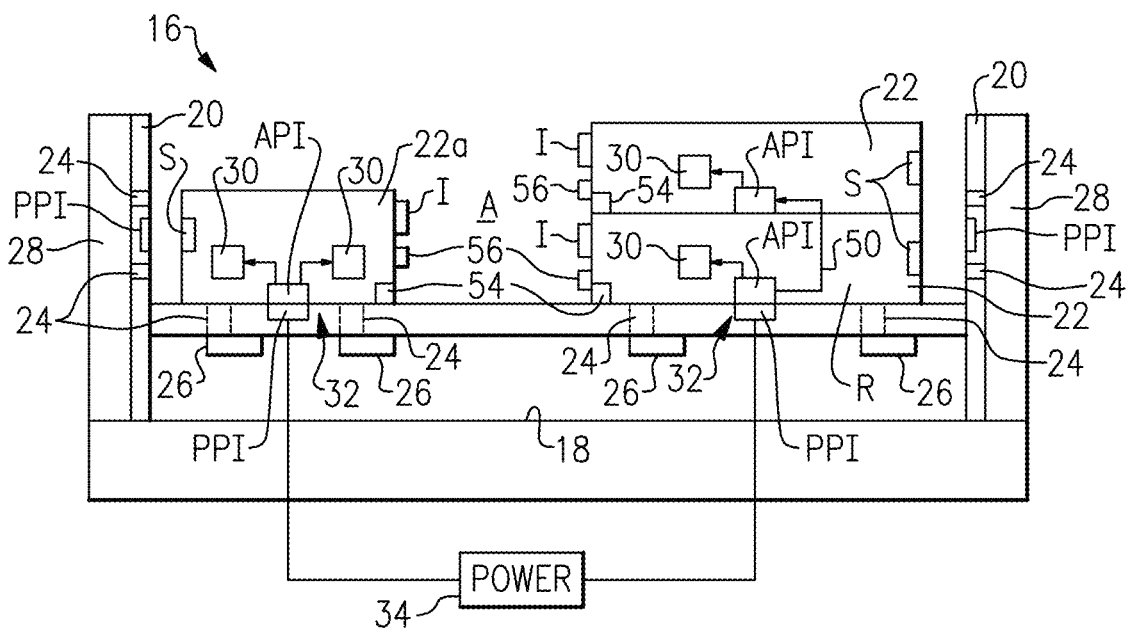
FIG. 2 is a schematic section view of multiple accessories mounted to a base plate.

FIGS. 1-2 disclose an exemplary embodiment of a base plate system that is configured to support a plurality of accessories within a vehicle cargo area A. In one example, a vehicle 10 includes a passenger compartment 12 and a tailgate 14 that encloses one end of a cargo bed 16 that is aft of the passenger compartment 12. The cargo bed 16 has a floor/support surface 18 and provides an open cargo area A. In this example, the vehicle 10 is a pickup truck. However, the vehicle 10 could be another type of vehicle in another example, such as a car, van, sport utility vehicle, etc. that has a support surface 18 for a cargo area A.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional internal combustion engine vehicle.

In particular, the example vehicle 10 includes an electrified powertrain capable of applying a torque from an electric machine M (e.g., an electric motor) to drive a least one set of wheels W. The vehicle 10 can include a traction battery pack B, which powers the electric machine M and, potentially, other electrical loads of the vehicle 10.

At least one base plate 20 is positioned within the cargo bed 16. Various accessories and/or modules 22 can be secured to the vehicle 10 by engaging one or more of the base plates 20. The accessories/modules 22 can comprise a lockable storage accessory 22 that holds hand tools and other work site items, a refrigerator R, cooler, etc. The accessory 22 could also be a lidded lockable container 22a that includes a compartment for storing power tools or other items 30 that require power or a data connection.

The accessories 22 can engage one or more of the base plates 20 using an attachment system. The base plate 20 comprises a four-sided generally flat and planar mount surface to support the accessories 22. In the exemplary embodiment, the attachment system for the base plate 20 includes a plurality of apertures 24 and at least one foot 26 that cooperate with each other to provide a mechanical connection interface. The base plate 20 is supported relative to the vehicle surface 18 of the cargo area A with an additional support interface that is separate from the mechanical connection interface for the accessories 22.

In one example, the base plate 20 provides the apertures 24 and the accessories 22 include the plurality of feet 26. This could be rearranged, however, such that one or all of the feet 26 extend from the base plate 20 and the accessories 22 provide some or all of the apertures 24.

In the exemplary embodiment, when the base plate 20 and the accessories 22 are engaged, the feet 26 are each received within one of the apertures 24 such that the feet 26 each extend from a first side of the base plate 20, through one of the apertures 24, and past an opposite, second side of the base plate 20. Once the feet 26 are inserted through the apertures, the feet are moved to a locking position such that the accessory cannot be removed from the base plate 20. To remove the accessory, the feet 26 are moved to an unlocking position such that the accessory can be lifted from the base plate 20.

FIG. 2 shows a configuration where the accessories/boxes 22 are supported on a floor of a truck bed. The accessories/boxes 22 could also be mounted on side walls 28 of the vehicle 10. For example, base plates 20 with apertures 24 could be mounted to the side walls 28 as shown in FIG. 2, such that accessories/boxes 22 could additionally be mounted at those locations. This configuration is especially useful for work van applications.

In another example, the accessories/boxes 22 can be stacked on top of each other as shown in FIG. 2. In this configuration, a power feed through structure 50 would be provided such that the power supplied to the lower accessory can be transferred to the upper accessory stacked on top of the lower accessory. The power feed through structure 50 could comprise a direct electrical connection or a wireless charging connection, for example. The power feed through structure 50 can be used for charging and for locking/unlocking of the upper accessories/boxes 22.

In one example, the accessory 22 comprises an accessory box that includes a power interface 32 as shown in FIG. 2. This would allow devices within the accessory box to be powered from a vehicle power supply 34 such as the battery pack B, for example. The internal device could be a refrigerated container that is powered by the vehicle 10 when the accessory box is engaged with the base plate 20, or the devices within the box/accessory could comprise rechargeable tools 30, which can be recharged when set within the accessory/box and coupled to the charging interface 32 between the accessory 22 and the base plate 20.

In one example, the base plate 20 can be plugged into either 12V vehicle power or other power sources via a variety of connections/outlets. These power sources supply power to charge or power the accessories 22 via the power supply connection interface 32 on the base plate 20.

As shown in FIG. 2, each accessory has an accessory power interface (API) and each base plate charging location has a plate power interface (PPI). The API and the PPI can be a direct electrical connection or can be via an inductive wireless charging connection. The PPI receive vehicle power via the vehicle power supply 34. Applicant's co-pending application "ACCESSORY BASE PLATE WITH POWER ROUTING" having Ser. No. 18/107,311, filed on Feb. 8, 2023, shows examples of connections to a power box and is herein incorporated by reference. An example of an inductive wireless charging connection is found in applicant's application Ser. No. 17/851,394, filed on Jun. 28, 2022, and which is herein incorporated by reference.

Various issues are raised concerning attaching and locking the accessories/boxes 22 to the base plate 20 and locking of the accessories/boxes 22 themselves. First, only certain personnel may be authorized to access the accessories 22. Second, the accessories 22 may need to be taken off the vehicle 10 and moved about a worksite or interchanged with other vehicles 10. For example, a vehicle 10 transporting multiple accessories 22 can arrive at a building or work site to start a work day. Some accessories may be taken into the building, while some accessories may be left on the vehicle. Additionally, during the day, the vehicle 10 may move one or more of the accessories 22 between different worksites.

Figure 3:
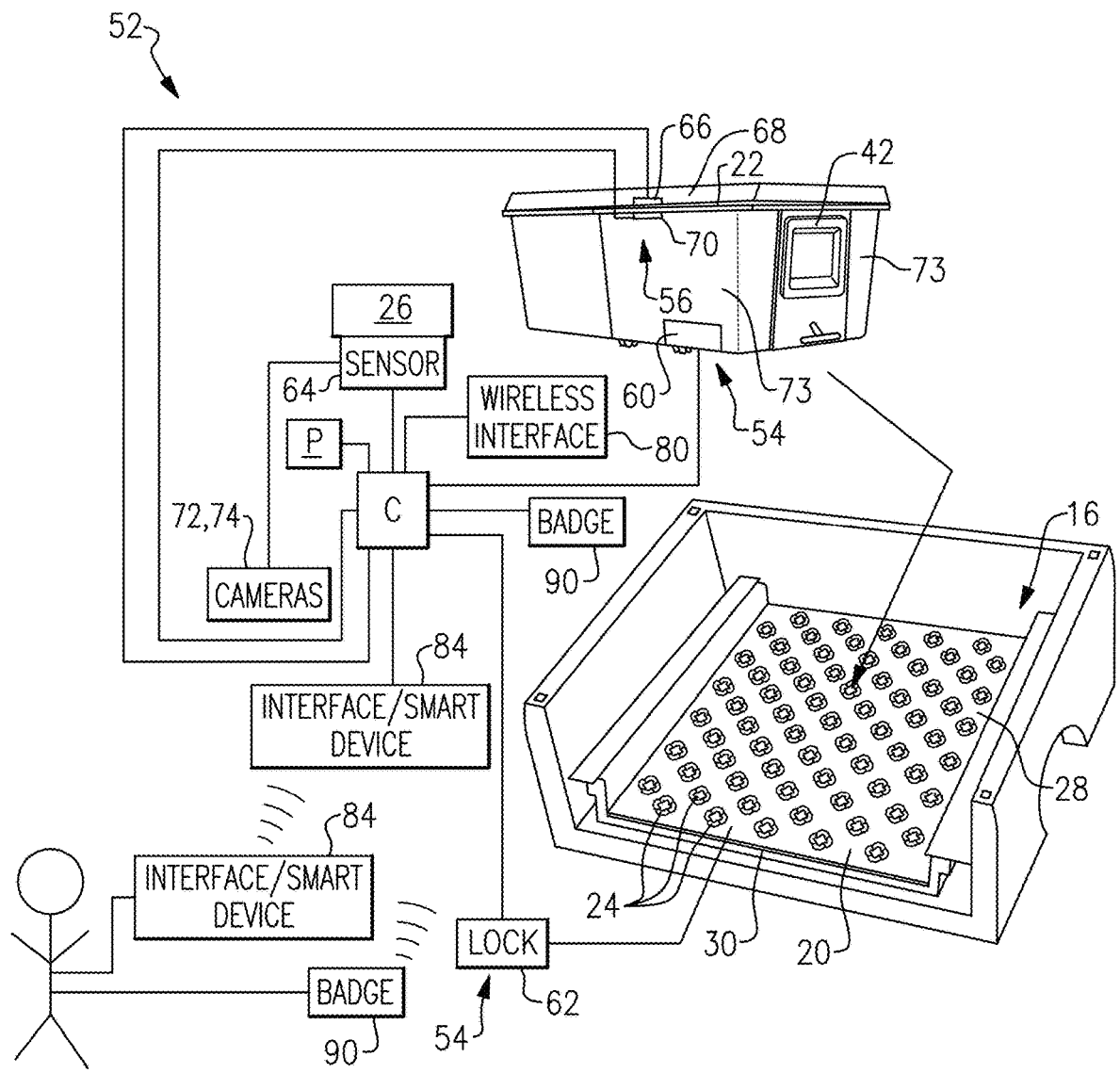
FIG. 3 is a schematic view of a user interacting with an accessory that is configured to be locked to a base plate and which includes a lockable lid.

In one example, FIG. 3 shows a locking control system 52 that includes a system controller C that utilizes a user profile P comprising one or more classes of authorization. In one example, the classes of authorization comprise job titles. In one example, locking and unlocking of the accessories/boxes 22 to the base plate 20 is controlled based on the user profile P and/or locking and unlocking of the accessory 22 itself is controlled based on the user profile P. In another example, both locking and unlocking of the accessories/boxes 22 to the base plate 20 and locking and unlocking of the accessory 22 itself is controlled based on the user profile P.

The locking control system 52 includes a plate locking mechanism 54 (schematically shown in FIG. 3) that is moveable between a locked position where the accessories/boxes 22 are locked to the base plate 20 and an unlocked position where the accessories/boxes 22 can be removed from the base plate 20. The locking control system 52 also includes an accessory locking mechanism 56 (schematically shown in FIG. 3) that has a locked condition where access to the accessories/boxes 22 is permitted and an unlocked condition where access to the accessories/boxes 22 is not permitted. Examples of locking mechanisms are disclosed in applicant's co-pending application Ser. No. 17/865,587 filed on Jul. 15, 2022, and application Ser. No. 17/993,345 filed on Nov. 23, 2022, which are herein incorporated by reference.

In one example, the plate locking mechanism 54 includes a first lock member 60 associated with the accessory/box 22 and a second lock member 62 associated with the base plate 20. In one example, the plate locking mechanism 54 can be wirelessly actuated, for example, the plate locking mechanism 54 can be Bluetooth Low Energy (BLE) actuated by a vehicle control module C. In one example, the first 60 and second 62 lock members can comprise an electronically actuated latch mechanism or solenoid lock connection. In another example, the mounting feet can be moved into a lock position and a position sensor/limit switch 64 can tell if the feet 26 have moved to the locked position and actuate a member to hold the feet 26 in a locked position until unlocking authorization is received.

In one example, the accessory locking mechanism 56 includes a first lock member 66 associated with a lid 68 of the accessory/box 22 and a second lock member 70 associated with one or more walls 73 of the accessory/box 22. In one example, the accessory locking mechanism 56 can be wirelessly actuated, for example, the accessory locking mechanism 56 can BLE actuated by the controller C. In one example, the first 66 and second 70 lock members can comprise an electronically actuated latch mechanism or solenoid lock connection.

As discussed above, locking and unlocking of the plate locking mechanism 54 and locking and unlocking of the accessory locking mechanism 56 is controlled based on user profile P information provided to the controller C. In one example, the profiles, e.g. classes of authorization, can be created by the user or owner of a business that uses one or more vehicles. In one example, classes or titles of authorization identify levels of authority for worksite jobs including construction (foreman, contractor, etc.), electrical, plumbing, painting, assistant and/or general helper. This fits well with large commercial job sites where there may be hundreds of people that would have to be managed for authorization. In one example, the job titles include at least a first title and a second title, wherein the first title has authorization for unlocking only one of the plate locking mechanism 54 and the accessory locking mechanism 56, and the second title has authorization for unlocking both of the plate locking mechanism 54 and the accessory locking mechanism 56. In one example, a foreman on the work site would have access to all accessories/boxes 22 as compared to a plumbing crew member who would only have access to specific plumbing boxes that support plumbing work.

In one example, the job title or level of authorization of an individual at a work site can be determined via an associated smart device 84, e.g. phone, tablet, etc., or a credential/badge 90 with an identification tag that wirelessly communicates with the controller C. In another example, vehicle sensors, such as cameras 72-74, can be utilized to determine the identities of people that are listed with their respective job titles in the user profile database supplied to the controller C. In another example, job titles or levels of authorization can be assigned codes that can be entered via a vehicle computer interface or smart device 84 for locking/unlocking purposes.

In another example, the controller C can authorize unlocking of the plate locking mechanism 54 and/or the accessory locking mechanism 56 if an approved job title from the user profile P is within a predetermined distance from the accessory/box 22. This adds a further mode to the user profile P such that accessories/boxes 22 will unlock when a certain class of person or authorization is within a specified distance. The distance can be measured by BLE tag/PAAK/etc. One example of this situation would be if a master plumber is within a specified distance, e.g. 200 ft, then any assistants or helpers associated with, or tied to, the master plumber can access plumbing boxes.

In another example, the controller C can authorize selected job titles or levels of authorization from the user profile P at a plurality of worksites. For example, profiles can be authorized for a single job site, e.g. via GPS for example, or multiple work sites. This is bonus for a large commercial enterprise where skilled trades people are more likely move between sites.

In another example, the controller C generates a locking signal to automatically lock the plate locking mechanism 54 and the accessory locking mechanism 56 when a vehicle associated with the base plate 20 exceeds a predetermined speed. Vehicle sensors, such as accelerometers for example, can be used to measure movement speed. This conserves battery box power by preventing unnecessary repeated locking/unlocking. Additionally, on large commercial work sites, boxes 22 may be moved from place to place typically at walking speed, in which case there is no need to lock the lid 68 to the box 22 or lock the feet 26 to the base plate 20 if the box 22 is on a base plate 20. However, as speed goes higher than a predetermined level, e.g. 5 mph, the controller C would automatically lock both the lid 68 to the box 22 and the feet 26 to the plate 20 to prevent tools from spilling out or a box 22 bouncing off the vehicle 10 during travel over rough ground.

In another example, the controller C automatically locks the plate locking mechanism 54 and the accessory locking mechanism 56 if connectivity with the locking system controller C is lost. This prevents tools or boxes being left unlocked if connectivity is lost for any reason. This specifically prevents attack or theft from someone using signal jammers, for example.

In one example, existing vehicle sensors are used to provide information to the system controller C to determine locking status. The sensors can include one or more of a center high-mounted stop lamp (CHMSL) camera 72, additional cameras 74, sonar and/or radar sensors 76, and any other vehicle sensors 78, e.g. on-board scales (OBS), etc., to determine position/location of accessories and charging stations in the cargo area A, and to determine whether or not an accessory/box 22 is in a locked/unlocked condition. Wireless communication via a wireless interface 80 also takes place between accessories/boxes 22 attached to the base plate 20 and the controller C to determine if accessories/boxes 22 are actually attached/locked to the base plate 20, and to determine a locking status of each accessory/box 22. Wireless communication can also take place between any of the sensors 72-78 and the controller C.

In another example, the controller C can receive data regarding the type of each accessory/box 22 through a unique identifier code, for example. In one example, the accessories/boxes 22 can each have a unique identifier I, such as a unique radio frequency identification (RFID) and/or Bluetooth® low energy (BLE) tag, or an Ultra-Wideband (UWB) tag. The vehicle can use signal triangulation to understand where each accessory/box 22 is located.

In one example, the controller C also receives data from a user/driver or database regarding the details of each workday, jobsite, and type of work being done. Each accessory 22 also includes sensors S and communication protocols to communicate locking status, charging status, and power requirements to the controller C.

In one example, the system controller C communicates with and/or monitors travel information to determine if the vehicle will be travelling to multiple work site locations and is configured authorize specified job titles and levels of authorization at all work sites or only specified work sites. In one example, work site information is obtained via a guidance system 82 (GPS, for example), a user's schedule, and/or a user's smart device 84. Once the controller C identifies that the accessories/boxes 22 are at the correct location, the specified job titles are authorized to access the appropriate accessories/boxes 22.

In one example, the controller C is a dedicated control unit, or the controller C can be incorporated as part of an existing controller on the vehicle 10. The controller C can include a processor, memory, and one or more input and/or output (I/O) device interface(s) that are communicatively coupled via a local interface. The local interface can include, for example but not limited to, one or more buses and/or other wired or wireless connections. The local interface may include address, control, and/or data connections to enable appropriate communications among the aforementioned components. The controller C may be a hardware device for executing software, particularly software stored in memory. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The software in the memory may include one or more separate programs, each of which includes an ordered listing of executable instructions for implementing logical functions. The Input/Output devices that may be coupled to system I/O Interface(s) may include input devices, for example but not limited to, a keyboard, mouse, scanner, microphone, camera, proximity device, smart device, etc. Further, the Input/Output devices may also include output devices, for example but not limited to, a printer, display, smart device, etc. The controller C can be configured to execute software stored within the memory, to communicate data to and from the memory, and to generally control operations of the computing device pursuant to the software.

The subject disclosure provides a locking control system 52 that allows locking/unlocking based on a profile P of a person on a job site. Examples of such profiles would include construction (foreman, contractor, etc.), electrical, plumbing, painting, assistant, general helper, etc. The definitions of the profiles are created by the user, and these classes of authorization can be used on a single job site or multiple job sites as workers may travel between many different sites during the day. Additionally, the locking control system 52 adds a further mode to the profile in that the accessories/boxes will unlock when a certain authorized class and/or profiled person is within a certain distance of the box. For example, electrical boxes would unlock when the master electrician is within a certain distance, which will allow electrical apprentices to access the boxes. The locking control system 52 also controls locking/unlocking based on vehicle speed, such that mounting feet and lids would be locked if the vehicle exceeds a speed threshold. Finally, the locking control system 52 automatically locks feet and lids if connectivity is lost to prevent theft.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A method comprising:
   providing a base plate with an attachment interface;
   providing the base plate with a plurality of apertures spaced apart from each other across a planar surface of the base plate;
   providing at least one accessory with one or more feet;
   attaching the at least one accessory to the base plate in a selected one of a plurality of different accessory mounting locations on the planar surface via the attachment interface by inserting the one or more feet through one or more of the plurality of apertures;
   positioning the base plate within a cargo area of a vehicle, and having the plurality of apertures extend through an entire thickness of the base plate such that at least a portion of the one or more feet is positionable between a lower surface of the base plate and a vehicle surface of the cargo area:
providing a user profile comprising one or more classes of authorization; and
controlling locking and unlocking of the at least one accessory to the base plate based on the user profile and/or controlling locking and unlocking of the at least one accessory itself based on the user profile.

2. The method of claim 1, including controlling locking and unlocking of the at least one accessory to the base plate based on the user profile and controlling locking and unlocking of the at least one accessory itself based on the user profile.

3. The method of claim 1, wherein the one or more classes of authorization comprise at least job titles.

4. The method of claim 3, including providing:
a plate locking mechanism moveable between a locked position where the at least one accessory is locked to the base plate and an unlocked position where the at least one accessory can be removed from the base plate, and
an accessory locking mechanism that has a locked condition where access to the at least one accessory is not permitted and an unlocked condition where access to the at least one accessory is permitted.

5. The method of claim 4, wherein the job titles include at least a first title and a second title, wherein the first title has authorization for unlocking only one of the plate locking mechanism and the accessory locking mechanism, and the second title has authorization for unlocking both of the plate locking mechanism and the accessory locking mechanism.

6. The method of claim 5, wherein a controller controls both the plate locking mechanism and the accessory locking mechanism based on the user profile.

7. The method of claim 6, wherein the job titles identify levels of authority for worksite jobs including construction, electrical, plumbing, painting, and/or general helper, and wherein a user includes an identifier associated with at least one of the job titles that communicates with the controller.

8. The method of claim 4, including authorizing unlocking of the plate locking mechanism and/or the accessory locking mechanism if a user with an approved job title from the user profile is within a predetermined distance from the at least one accessory.

9. The method of claim 4, including authorizing selected job titles from the user profile at a plurality of worksites.

10. The method of claim 1, including powering the locking and unlocking of a plate locking mechanism, and powering the locking and unlocking an accessory locking mechanism, via a vehicle power supply associated with a power connection interface between the base plate and the at least one accessory.

11. The method of claim 10, including powering the at least one accessory and items located within the at least one accessory via the vehicle power supply through the power connection interface.

12. A method comprising:
providing a base plate with an attachment interface;
attaching at least one accessory to the base plate via the attachment interface;
providing a user profile comprising one or more classes of authorization, wherein the one or more classes of authorization comprise at least job titles; and
controlling locking and unlocking of the at least one accessory to the base plate based on the user profile and/or controlling locking and unlocking of the at least one accessory itself based on the user profile;
providing:
a plate locking mechanism moveable between a locked position where the at least one accessory is locked to the base plate and an unlocked position where the at least one accessory can be removed from the base plate, and
an accessory locking mechanism that has a locked condition where access to the at least one accessory is not permitted and an unlocked condition where access to the at least one accessory is permitted; and
automatically locking the plate locking mechanism and the accessory locking mechanism when a vehicle associated with the base plate exceeds a predetermined speed.

13. A method comprising:
providing a base plate with an attachment interface;
attaching at least one accessory to the base plate via the attachment interface;
providing a user profile comprising one or more classes of authorization, wherein the one or more classes of authorization comprise at least job titles; and
controlling locking and unlocking of the at least one accessory to the base plate based on the user profile and/or controlling locking and unlocking of the at least one accessory itself based on the user profile;
providing:
a plate locking mechanism moveable between a locked position where the at least one accessory is locked to the base plate and an unlocked position where the at least one accessory can be removed from the base plate, and
an accessory locking mechanism that has a locked condition where access to the at least one accessory is not permitted and an unlocked condition where access to the at least one accessory is permitted; and
automatically locking the plate locking mechanism and the accessory locking mechanism if connectivity with a locking system controller is lost.

14. A locking control system comprising:
a base plate that provides an attachment interface on a support surface, the base plate configured to engage with at least one accessory via the attachment interface to secure the at least one accessory to the support surface, wherein the base plate comprises a flat and planar mount surface to support the at least one accessory, and wherein the base plate is positionable within a cargo area of a vehicle;
wherein the attachment interface comprises a plurality of apertures formed within the base plate and at least one foot associated with the at least one accessory such that the at least one accessory is positionable on the base plate in a selected one of a plurality of different mounting locations within the cargo area;
wherein the plurality of apertures extend through an entire thickness of the base plate such that at least a portion of the at least one foot of the at least one accessory is positionable between a lower surface of the base plate and a vehicle surface of the cargo area:
a user profile comprising one or more classes of authorization; and
a controller to control locking and unlocking of the at least one accessory to the base plate based on the user profile and/or to control locking and unlocking of the at least one accessory itself based on the user profile.

15. The locking control system of claim 14, including a plate locking mechanism moveable between a locked position where the at least one accessory is locked to the base plate and an unlocked position where the at least one accessory can be removed from the base plate, and wherein the at least one accessory includes an accessory locking mechanism that has a locked condition where access to the at least one accessory is not permitted and an unlocked condition where access to the at least one accessory is permitted.

16. The locking control system of claim 15, wherein the controller controls both the plate locking mechanism and the accessory locking mechanism based on the user profile.

17. The locking control system of claim 15, wherein the one or more classes of authorization comprise at least job titles, and wherein a user includes an identifier associated with at least one of the job titles that communicates with the controller.

18. The locking control system of claim 17, wherein the job titles include at least a first title and a second title, wherein the first title has authorization for unlocking only one of the plate locking mechanism and the accessory locking mechanism, and the second title has authorization for unlocking both of the plate locking mechanism and the accessory locking mechanism.

19. The locking control system of claim 17, wherein unlocking of the plate locking mechanism and/or the accessory locking mechanism is authorized if a user with an approved job title from the user profile is within a predetermined distance from the at least one accessory.

20. The locking control system of claim 17, wherein selected job titles from the user profile are authorized at a plurality of worksites.

21. The locking control system of claim 14, including a power connection interface between the at least one accessory and the base plate, wherein locking and unlocking of a plate locking mechanism and an accessory locking mechanism is powered by a vehicle power supply via a vehicle controller.

22. The locking control system of claim 21, wherein the power connection interface powers the at least one accessory and items located within the at least one accessory via the vehicle power supply.

23. A locking control system comprising:
a base plate that provides an attachment interface on a support surface, the base plate configured to engage with at least one accessory via the attachment interface to secure the at least one accessory to the support surface;
a user profile comprising one or more classes of authorization; and
a controller to control locking and unlocking of the at least one accessory to the base plate based on the user profile and/or to control locking and unlocking of the at least one accessory itself based on the user profile;
a plate locking mechanism moveable between a locked position where the at least one accessory is locked to the base plate and an unlocked position where the at least one accessory can be removed from the base plate, and wherein the at least one accessory includes an accessory locking mechanism that has a locked condition where access to the at least one accessory is not permitted and an unlocked condition where access to the at least one accessory is permitted; and
wherein the controller automatically locks the plate locking mechanism and the accessory locking mechanism when a vehicle associated with the base plate exceeds a predetermined speed.

24. A locking control system comprising:
a base plate that provides an attachment interface on a support surface, the base plate configured to engage with at least one accessory via the attachment interface to secure the at least one accessory to the support surface;
a user profile comprising one or more classes of authorization; and
a controller to control locking and unlocking of the at least one accessory to the base plate based on the user profile and/or to control locking and unlocking of the at least one accessory itself based on the user profile;
a plate locking mechanism moveable between a locked position where the at least one accessory is locked to the base plate and an unlocked position where the at least one accessory can be removed from the base plate, and wherein the at least one accessory includes an accessory locking mechanism that has a locked condition where access to the at least one accessory is not permitted and an unlocked condition where access to the at least one accessory is permitted; and
wherein the plate locking mechanism and the accessory locking mechanism are automatically locked if connectivity with the controller is lost.

25. A locking control system comprising:
a base plate that provides an attachment interface on a support surface, the base plate configured to engage with at least one accessory via the attachment interface to secure the at least one accessory to the support surface,, wherein the base plate comprises a flat and planar mount surface to support the at least one accessory, and wherein the base plate is positionable within a cargo area of a vehicle;
a user profile comprising one or more classes of authorization; and
a controller to control locking and unlocking of the at least one accessory to the base plate based on the user profile and/or to control locking and unlocking of the at least one accessory itself based on the user profile; and
wherein the attachment interface comprises a plurality of apertures and at least one foot that cooperate with each other to provide a mechanical connection interface, and wherein the plurality of apertures extend through an entire thickness of the base plate such that the at least one foot is received within one of the plurality of apertures such that the at least one foot extends from a first side of the base plate, through the one of the plurality of apertures, and past an opposite, second side of the base plate.

* * * * *